Figure 1:
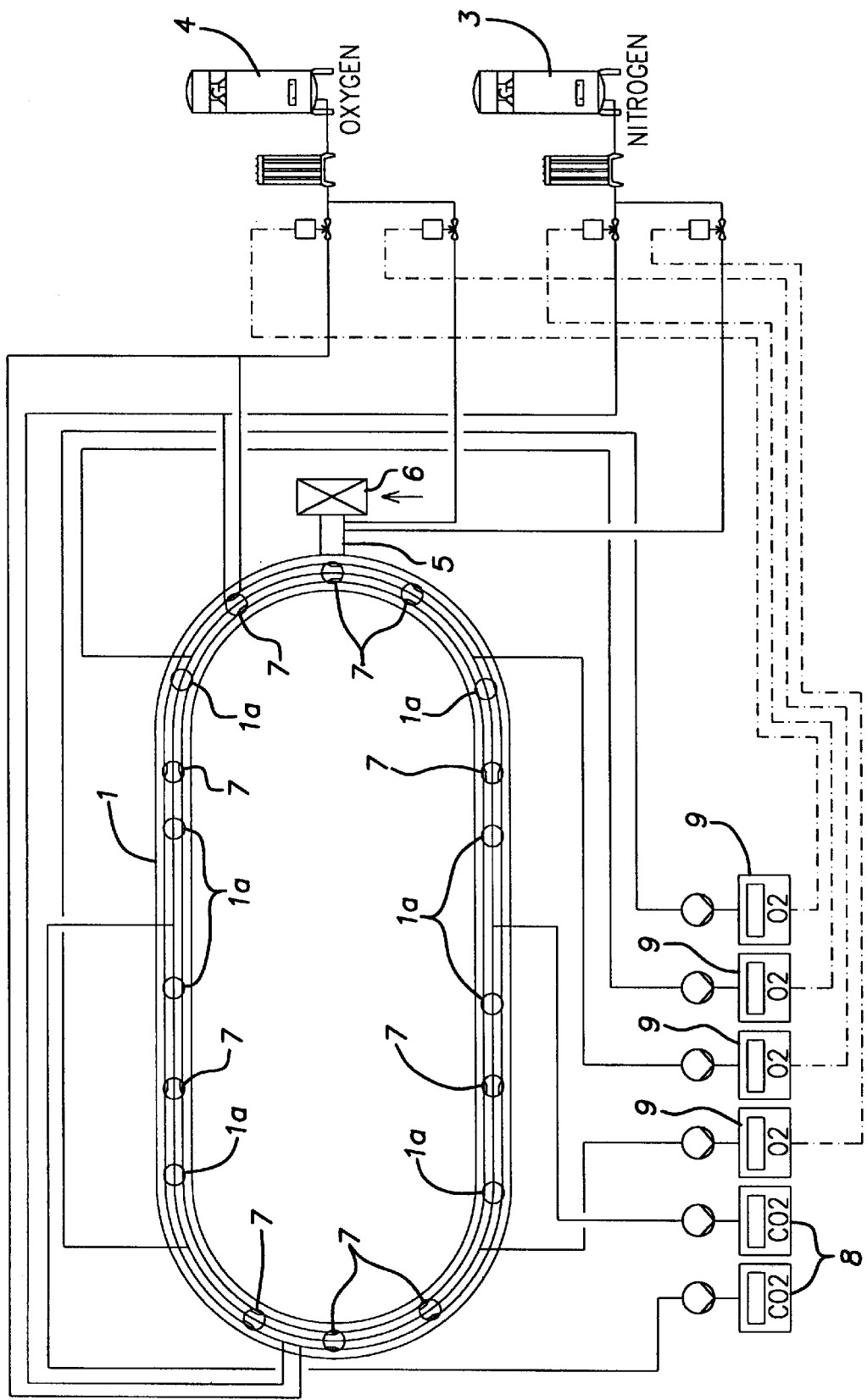

United States Patent [19]
Wasastjerna et al.

[11] Patent Number: 5,860,857
[45] Date of Patent: Jan. 19, 1999

[54] METHOD AND APPARATUS FOR CONTROLLING THE ATMOSPHERE OF AN ESSENTIALLY CLOSED SPACE

[75] Inventors: Jan Wasastjerna, Kauniainen; Heikki Rusko, Jyväskylä, both of Finland

[73] Assignee: AGA Aktiebolag, Lidingo, Sweden

[21] Appl. No.: 557,069

[22] PCT Filed: Nov. 4, 1994

[86] PCT No.: PCT/FI94/00498

§ 371 Date: May 13, 1996

§ 102(e) Date: May 13, 1996

[87] PCT Pub. No.: WO95/13044

PCT Pub. Date: May 18, 1995

[30] Foreign Application Priority Data

Nov. 9, 1993 [FI] Finland .................................. 934944
Mar. 16, 1994 [FI] Finland .................................. 941228

[51] Int. Cl.[6] .................................................. F24F 7/007
[52] U.S. Cl. ............................................. 454/338; 454/254
[58] Field of Search .................................. 454/254, 256, 454/338

[56] References Cited

U.S. PATENT DOCUMENTS 3,215,057 11/1965 Turek ........................................ 454/70
3,415,310 12/1968 Kuhlmann .
3,565,072 2/1971 Gauthier .
3,587,574 6/1971 Mercer et al. .
5,101,819 4/1992 Lane .
5,109,837 5/1992 Gamow .
5,133,339 7/1992 Whalen et al. .

FOREIGN PATENT DOCUMENTS 0277787 8/1988 European Pat. Off. .
3101618 11/1982 Germany .

*Primary Examiner*—Harold Joyce
*Assistant Examiner*—Derek S. Boles
*Attorney, Agent, or Firm*—Pearne, Gordon, McCoy & Granger LLP

[57] ABSTRACT

The invention relates to a method for regulating the atmosphere in a substantially closed sports/exercise space (1) or an animal shelter (11), especially in terms of partial oxygen pressure. In the method, the normal atmosphere of said space (1; 11) is admixed with nitrogen for the creation of a desired low-oxygen (oxygen content <appr. 21%) atmosphere, said low-oxygen atmosphere corresponding to partial oxygen pressure in the air at a certain altitude above sea level. Alternatively, said normal atmosphere is admixed with oxygen for the creation of a desired high-oxygen (oxygen content>appr. 21%) atmosphere. Said mixing of nitrogen or oxygen with air is carried out at normal air pressure.

20 Claims, 3 Drawing Sheets

METHOD AND APPARATUS FOR CONTROLLING THE ATMOSPHERE OF AN ESSENTIALLY CLOSED SPACE

The present invention relates to a method for regulating the atmosphere in a substantially closed space, such as a sports/exercise facility, an animal shelter or a like, especially in terms of partial oxygen pressure. The invention relates also to a space which is regulable in terms of its atmosphere and/or wind conditions.

The competitive athletes participating in endurance sports, such as distance running, cross-country skiing, swimming, cycling etc., pay frequent visits to high-altitude training camps. One of the drawbacks of such camps is e.g. that the camps have a limited duration and getting used to air with a lower oxygen content takes its own time. In addition, the atmospheric pressure is considerably lower than what is experienced at sea level, as disclosed in table 1. Such a lower pressure may cause problems to the organism.

TABLE 1

The atmospheric pressure at various altitudes at 64° degrees of north latitude and the oxygen content of air corresponding to partial oxygen pressure at sea level.

|  | 64° of north latitude | | corresponding oxygen content at sea level | |
| --- | --- | --- | --- | --- |
| Altitude | January mbar | July mbar | January % $O_2$ | July % $O_2$ |
| 0 | 1013,5 | 1012,5 | 21,0 | 21,0 |
| 2000 | 776 | 792 | 16,1 | 16,4 |
| 2500 | 725 | 745 | 15,0 | 15,6 |
| 3000 | 678 | 699 | 14,0 | 14,5 |
| 3500 | 633 | 656 | 13,1 | 13,6 |
| 4000 | 591 | 616 | 12,2 | 12,8 |
| 4500 | 553 | 577 | 11,5 | 12,0 |
| 5000 | 514 | 540 | 10,7 | 11,2 |

According to table 1, for example, at the altitude of 3000 m above sea level the atmospheric pressure in January is 678 mbar while it is 1013,5 mbar at sea level. The atmosphere at such altitude has a partial oxygen pressure which at sea level corresponds to the oxygen content of 14,0% (in January).

An object of the invention is to provide a method, whereby the oxygen content of a substantially closed space, e.g. a sports/exercise hall or an animal shelter, can be regulated or adjusted in a desired direction, for example to create a low-oxygen atmosphere (oxygen content≦21%) or a high-oxygen atmosphere (oxygen content ≧21%). In view of achieving this object, a method of the invention is characterized by what is set forth in the characterizing clause of claim 1. On the other hand, a substantially closed space of the invention is characterized by what is set forth in the characterizing clause of claim 5 or 6.

The benefits gained by a method and a sports/exercise space or facility of the invention include e.g. a possibility of creating permanent low-oxygen conditions in the space. It is much more inexpensive to train in this type of space than to travel abroad to a high-altitude camp. In addition, such an atmospherically regulable space can be exploited by more athletes than those with a chance to go abroad to a high-altitude camp. Furthermore, the invention is useful in avoiding the uncomfortable transports of racing animals to high-altitude camps, which are relatively few and far between e.g. for horses.

A person spending days, weeks or years at altitude gets more and more used to low-oxygen air. Thus, the body experiences less and less adverse effects and a person is able to raise his or her working capacity without consequential effects caused by the oxygen deficiency. Becoming further accustomed a person can also spend time at still a higher altitude. Getting used to such low-oxygen air brings about a number of significant alterations, the following list showing the top five:

1) pulmonary respiratory exchange increases remarkably
2) number of red corpuscles increases
3) pulmonary diffusion capacity increases
4) oxygen uptake of the cells increases despite the low-oxygen atmosphere.

On the other hand, spending time and/or training at a high-oxygen atmosphere offers certain benefits. During the course of a strenuous physical exercise, such as running at normal atmosphere (21% of oxygen), the respiration and oxygen uptake restrict the performance and stamina. By exercising at a high-oxygen (30–40% of oxygen) atmosphere, the above-mentioned bottleneck associated with normal atmosphere can be postponed. Thus, the exercise can be more intense and the athlete can work on e.g. his or her motorics.

Figure 2:
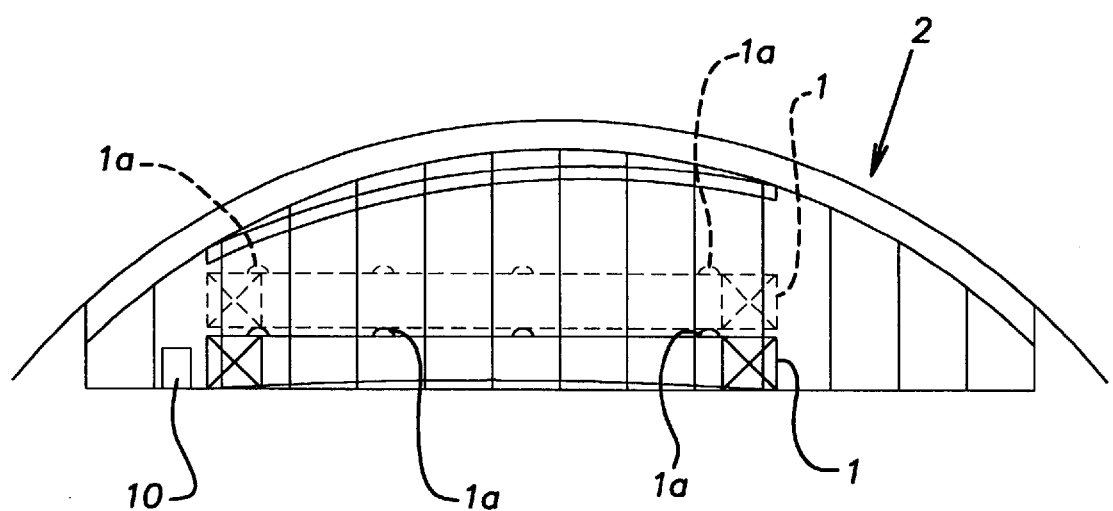
Figure 3:
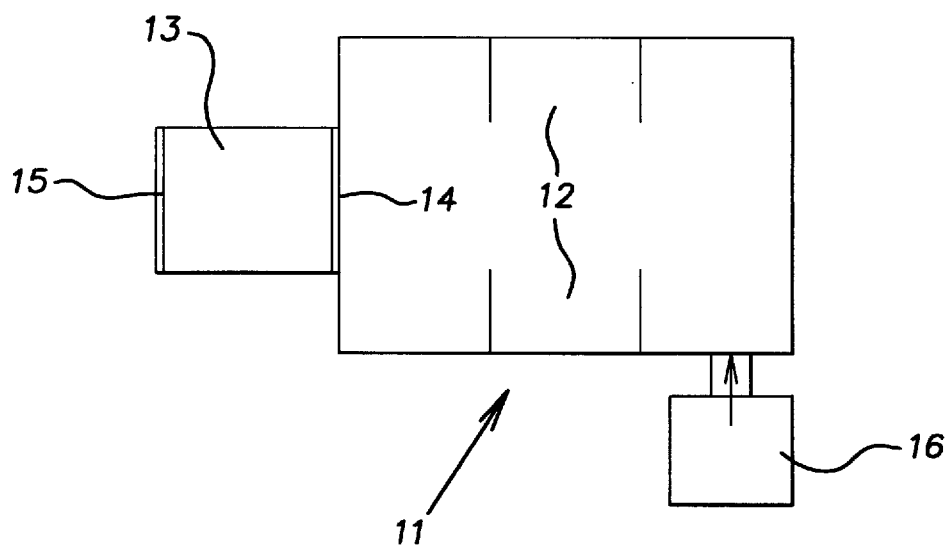

The invention will now be described in more detail with reference made to the accompanying drawings, in which:

FIG. 1 shows schematically one embodiment for an exercise space applicable to a method of the invention, FIG. 2 depicts an installation of the exercise space of FIG. 1 shown as a sectional view from the end of an existing sports hall, and FIG. 3 shows schematically one embodiment for an animal facility applicable to a method of the invention.

The embodiment shown in FIGS. 1–2 depicts one way of implementing a method and a sports/exercise space or facility of the invention for human use. Naturally, such a space can be implemented in many ways obvious to persons skilled in the art. In addition, a method of the invention can also be applied for varying the atmosphere of e.g. living quarters, hospitals or other healthcare institutions, whereby the atmospheric change can be used e.g. for various conditioning/treatment procedures instead of or in addition to the exercise associated with competitive sports. Thus, in the context of this application, the term sports/exercise space is considered to include also the spaces or facilities used for treatment or conditioning procedures and not just the spaces associated with actual sports.

The embodiment shown in FIGS. 1–2 represents a hoistable annular tunnel 1, which is located inside an existing indoor sports hall or arena 2 and provided with hoisting equipment, not shown. The tunnel 1 includes a plurality of transfer/hoist elements 1a to facilitate lifting/lowering of the tunnel 1 within the hall or arena 2. In FIG. 2, the tunnel 1 is shown by solid lines in its descended operative condition and by dash lines in a somewhat uplifted position. In view of lifting or hoisting, the tunnel is preferably collapsible, whereafter it is easier to lift to an appropriate height inside the hall. The hall 2 can be normally used for conventional physical exercise and the annular tunnel 1 is descended and provided with a desired atmosphere whenever necessary, e.g. for weekdays. A desired atmosphere is created in the tunnel 1 by blowing air and nitrogen or oxygen from containers 3, 4 with fans 5 directly inside the tunnel 1 until the atmosphere reaches a desired oxygen content. This is followed by blowing into the tunnel space a pre-blended mixture having a desired oxygen content for maintaining said desired atmosphere in the tunnel 1. This creation of an atmosphere adjusted in terms of its oxygen content is carried out at normal air pressure, thus avoiding the problems caused by a reduced pressure experienced in a high-altitude camp. The fan 5 is preferably fitted with a dryer unit 6 for drying the inbound air, if necessary. The tunnel 1 is further provided with supplementary fans 7, the number of which in the illustrated embodiment is 11. These supplementary fans are used for the circulation of air inside the tunnel, whereby the atmosphere remains as homogeneous as possible. In addition, these fans can be used for creating desired wind conditions in the tunnel 1. The wind speed in such an annular tunnel is preferably $\leq 2$ m/s.

The invention can also be used for making a separate wind tunnel, indicated in FIG. 2 by reference numeral 10. This type of wind tunnel facilitates the use relatively high wind speeds, for example $\leq 4$ m/s. The representative wind tunnel 10 is designed to have a length of approximately 100 m with a maximum wind speed of 4 m/s and the annular tunnel 1 is designed to have a length of approximately 200 m with a maximum wind speed of 2 m/s. Naturally, these readings may vary considerably depending on desired training conditions. A wind tunnel can be designed without a possibility of regulating the atmosphere.

The embodiment shown in FIG. 3 depicts one way of implementing a method of the invention applied to a horse stable. The illustrated stable includes six stalls 12. There is a passage into the stable through a corridor 13 provided with door elements, for example a door screen consisting of plastic ribbons, at either end 14, 15. Naturally, such a space can be created in many different ways obvious to persons skilled in the art. A method of the invention for changing an atmosphere can be used for improving the performance of animals and e.g. for a variety of conditioning/treatment procedures. A desired atmosphere is created in the stable 11 by blowing air and nitrogen or oxygen from a blower unit 16 into the stable 11 until the atmosphere reaches a desired oxygen content. This is followed by blowing into the stable a pre-blended mixture having a desired oxygen content for maintaining said desired atmosphere in the stable 11. This creation of an atmosphere adjusted in terms of its oxygen content is carried out at normal air pressure, thus avoiding the problems caused by a reduced pressure experienced at altitude. The blower unit 16 is preferably fitted with a dryer unit for drying the inbound air, if necessary. The inbound air is preferably carried into the stable by way of a duct system, said duct system (not shown) being provided with one or a plurality of valves for delivering the air to a desired location in the stable. If desired, the stable 11 can be provided with supplementary fans used for the circulation of air inside the stable, whereby the atmosphere remains as homogeneous as possible.

The exercise space 1 of the invention is further provided with continuous-action analyzers 8, 9 for monitoring the oxygen, carbon dioxide and humidity levels in the tunnel atmosphere. This information is used as a basis for regulating the mixing and delivering a new atmosphere. The minimum delivery rate of an atmosphere is preferably such that 5% of the tunnel atmosphere is replaced with a new one per hour. For example, when the tunnel capacity is 5000 m$^3$, the minimum delivery rate is 250 m$^3$/h. An animal space can also be provided with similar analyzers.

Tables 2–4 disclose examples of air mixing factors required for creating various oxygen atmospheres when using $N_2$ at 95%, $N_2$ at 100%,. and $O_2$ at 100%, respectively.

TABLE 2

Air mixing factors for the creation of various low-oxygen atmospheres when using $N_2$ at 95%.

| | Low-oxygen atmosphere | | |
|---|---|---|---|
| | 95% $N_2$ | Air | Atmosphere |
| 10% $O_2$ | 1 | 0,45 | 1,45 |
| 11% $O_2$ | 1 | 0,6 | 1,6 |
| 12% $O_2$ | 1 | 0,78 | 1,78 |
| 13% $O_2$ | 1 | 1 | 2 |
| 14% $O_2$ | 1 | 1,28 | 2,28 |
| 15% $O_2$ | 1 | 1,66 | 2,66 |
| 16% $O_2$ | 1 | 2,2 | 3,2 |

TABLE 3

Air mixing factors for the creation of various low-oxygen atmospheres when using $N_2$ at 100%.

| | Low-oxygen atmosphere | | |
|---|---|---|---|
| | 100% $N_2$ | Air | Atmosphere |
| 15% $O_2$ | 1 | 2,5 | 3,5 |
| 15% $O_2$ | 1 | 3,2 | 4,2 |
| 17% $O_2$ | 1 | 4,25 | 5,25 |

TABLE 4

Air mixing factors for the creation of various high-oxygen atmospheres when using $O_2$ at 100%.

| | High-oxygen atmosphere | | |
|---|---|---|---|
| | 100% $N_2$ | Air | Atmosphere |
| 30% $O_2$ | 1 | 7,8 | 8,8 |
| 35% $O_2$ | 1 | 4,65 | 5,65 |
| 40% $O_2$ | 1 | 3,15 | 4,15 |

An atmospheric regulating method of the invention (regulation of oxygen content) can be readily combined with the regulation of atmospheric humidity and/or temperature or other desired regulation procedures, which can be used e.g. for creating conditions that are essentially identical to those existing at a given currently interesting venue of competition.

A regulating method of the invention is preferably carried out by using liquid nitrogen or oxygen, especially when the creation of a desired atmosphere must be effected quickly, e.g. in a few hours. In case an atmosphere is maintained the same e.g. for several weeks and there is a sufficient amount of time, e.g. 12 hours, for the creation of an atmosphere, it would be possible to employ nitrogen and oxygen generators (on-site equipment), which would probably reduce operating costs. A mechanism of the invention can be made as simple as possible in such a manner that it is always designed to produce a constant atmosphere, for example a low-oxygen atmosphere containing appr. 16–16,5% of oxygen, which is equivalent to the altitude of about 2000 m above sea level. Thus, the regulating procedures and the equipment required-therefor can be omitted as unnecessary.

The above-described embodiment concerning an animal shelter relates to a horse stable but a method of the invention can be applied to the facilities for other animals as well, e.g. dogs, roosters etc. The method is especially suitable for improving the physical fitness of competing animals but it is also applicable to various treatment/ conditioning procedures for competing and/or other animals.

We claim:

1. A method for regulating an atmosphere in a substantially closed space on ground level, comprising the steps of supplementing a normal atmosphere of said space with nitrogen or with a mixture of nitrogen and oxygen, the supplement of nitrogen or said mixture in said normal atmosphere being used to create a desired low-oxygen atmosphere, said low-oxygen atmosphere corresponding to partial oxygen pressure in the air at a certain altitude above sea level, in which method said mixing of nitrogen or said mixture of nitrogen and oxygen with air is carried out at local ambient air pressure.

2. A method as set forth in claim 1, wherein nitrogen or said mixture of nitrogen and oxygen is directly blown into said closed space for adjusting the air therein to a desired oxygen content and pre-mixed air corresponding to said desired oxygen content is blown into said space for adjusting the atmosphere and maintaining the adjusted atmosphere.

3. A method as set forth in claim 1, wherein the method further comprises maintaining the atmosphere in motion within said space, whereby the atmosphere can be maintained essentially homogeneous.

4. A method as set forth in claim 3, wherein the atmosphere is kept in motion by means of fans for creating a desired wind at a desired location in said space.

5. A method as set forth in claim 2, wherein the method further comprises maintaining the atmosphere in motion within said space, whereby the atmosphere can be maintained essentially homogeneous.

6. A method as set forth in claim 5, wherein the atmosphere is kept in motion by means of fans for creating a desired wind at a desired location in said space.

7. A sports/exercise space having regulatable atmosphere and/or wind conditions, wherein said space is designed as a substantially closed space and provided with fan elements for blowing nitrogen or a mixture of nitrogen and oxygen into said space for adjusting an atmosphere within said space to a desired oxygen content and for producing a desired wind speed in said space, wherein the space is maintained at local ambient air pressure.

8. A space as set forth in claim 7, wherein said space is further provided with elements for producing a desired humidity condition and/or temperature.

9. A space as set forth in claim 7, wherein said space is further provided with monitoring elements for monitoring and correcting the space atmosphere.

10. A space as set forth in claim 7, wherein said space is defined by a fixed structure.

11. A space as set forth in claim 8, wherein said space is defined by a movable tunnel which is provided with transfer/hoist elements and fitted inside a larger sports/exercise hall.

12. An animal shelter having a space with a regulatable atmosphere, wherein said space is designed as a substantially closed space and provided with elements for blowing nitrogen or a mixture of nitrogen and oxygen into said space for adjusting the atmosphere of said space to a desired low-oxygen content atmosphere, said low-oxygen content atmosphere corresponding to partial oxygen pressure in the air at a certain altitude above sea level, wherein the space is maintained at local ambient air pressure.

13. A space as set forth in claim 12, wherein said space is further provided with elements for producing a desired humidity condition and/or temperature.

14. A space as set forth in claim 12, wherein said space is further provided with monitoring elements for monitoring and correcting its atmosphere whenever necessary.

15. A space as set forth in claim 8, wherein said space is further provided with monitoring elements for monitoring and correcting its atmosphere whenever necessary.

16. A space as set forth in claim 13, wherein said space is further provided with monitoring elements for monitoring and correcting its atmosphere whenever necessary.

17. A space as set forth in claim 9, wherein said space is defined by a movable tunnel, which is provided with transfer/hoist elements and fitted inside a larger sports/exercise hall.

18. A space as set forth in claim 10, wherein said space is defined by a movable tunnel, which is provided with transfer/hoist elements and fitted inside a larger sports/exercise hall.

19. A sports/exercise space where the atmosphere can be adjusted to a desired oxygen content by supplementing nitrogen or a mixture of nitrogen and oxygen in desired amounts to create a desired atmosphere in the space, wherein the space is defined by a transferable/hoistable and/or collapsible tunnel, and fans are provided for blowing nitrogen or said mixture into the space for creating a desired downwind/headwind, and that the supplement of nitrogen or said mixture is carried out at local ambient air pressure.

20. A space as set forth in claim 19, wherein said space is disposed within a larger sports/exercise hall.

* * * * *

UNITED STATES PATENT AND TRADEMARK OFFICE
CERTIFICATE OF CORRECTION

PATENT NO.   : 5,860,857
DATED        : January 19, 1999
INVENTOR(S)  : Wasastjerna et al.

It is certified that error appears in the above-indentified patent and that said Letters Patent is hereby corrected as shown below:

Column 4, Line 23, Table 3, delete "15% $O_2$" and insert --16% $O_2$--.

Column 4, Line 33, Table 4, delete "100% $N_2$" and insert --100% $O_2$--.

Column 4, Line 59, delete "required-" and insert --required--.

Signed and Sealed this

First Day of June, 1999

Attest:

Q. TODD DICKINSON

Attesting Officer

Acting Commissioner of Patents and Trademarks